May 8, 1956   L. C. REMOND   2,744,592
WAVE-GUIDE WINDOW
Filed Oct. 29, 1948

INVENTOR.
Louis C. Remond
BY
Attorney

United States Patent Office 2,744,592
Patented May 8, 1956

2,744,592

WAVE-GUIDE WINDOW

Louis C. Remond, Needham, Mass., assignor to Sylvania Electric Products Inc., a corporation of Massachusetts Application October 29, 1948, Serial No. 57,238

3 Claims. (Cl. 189—36.5)

The present invention relates to wave-guide transmission of high frequency energy, and is concerned principally with the provision of a hard-glass window serving as a barrier between two portions of a high-frequency channel where there are different gases at opposite sides of the window or where there is a pressure differential.

The present invention is concerned primarily with the structure and with the method of fabricating windows wherein the central glass area is comparatively small in relation to the entire window, particularly those of substantially flat circular form. In the ordinary approach to the manufacture of a circular window, for example, a disc of hard glass would be fused to an optionally pre-oxidized metal annulus having a suitable thermal coefficient. Even with the best available choice of metal for use with a specified glass, the difference in thermal characteristics between the glass and the metal sets up a certain amount of stress. Where there is a large section of metal relative to the glass, the strain that results is transmitted almost wholly to the glass, tending to crack it or at least to make it too fragile and unreliable for use. Additionally there is the serious tendency of any large plate of the metal to warp and bulge, due to slight inequalities in heating and in grain structure at various parts of the plate and due also to the resistance of the hard glass center to the compressional stress of the metal.

In accordance with the present invention, the foregoing difficulties are overcome by two novel practices, that are preferably used together. A zone of reduced thickness is formed in the metal frame surrounding the glass portion of the window. This thinned zone is effective in absorbing the differences in thermal constriction and expansion of the frame that would otherwise build up destructive stresses in the glass, and in isolating the glass center from the periphery of the window to afford better resistance to pressure differences on the two faces of the window and to physical distortion that may be imposed when the window is clamped to waveguide flanges. Secondly, the window is fabricated in two parts, first fusing the glass portion to a narrow frame at the necessary high temperature, and then securing another metal frame of the same thermal characteristic as the first to the outer edge of the first metal frame in a lower-temperature sealing operation. The two metal frames thus made and assembled can be substantially flat and, with the hard glass center, constitute a substantially flat window of excellent mechanical and electrical properties. The joint between the two metal frames is advantageously of solder, either the hard or the soft variety. In this way the temperature range to which the outer frame is subjected is comparatively limited. The stress that the outer frame applies to the enclosed and united material is much lower than it would be were a single large frame heated to the high temperature required for fusing and adhering the hard glass center. The outer frame is preferably of the same metal as the inner frame so that these two will not set up additional stresses due to differences in thermal expansion characteristics, and so that the joint is not subjected to inordinate stresses.

The invention will be better appreciated from the following detailed description of an illustrative embodiment shown in the accompanying drawings. In those drawings.

Figure 1:
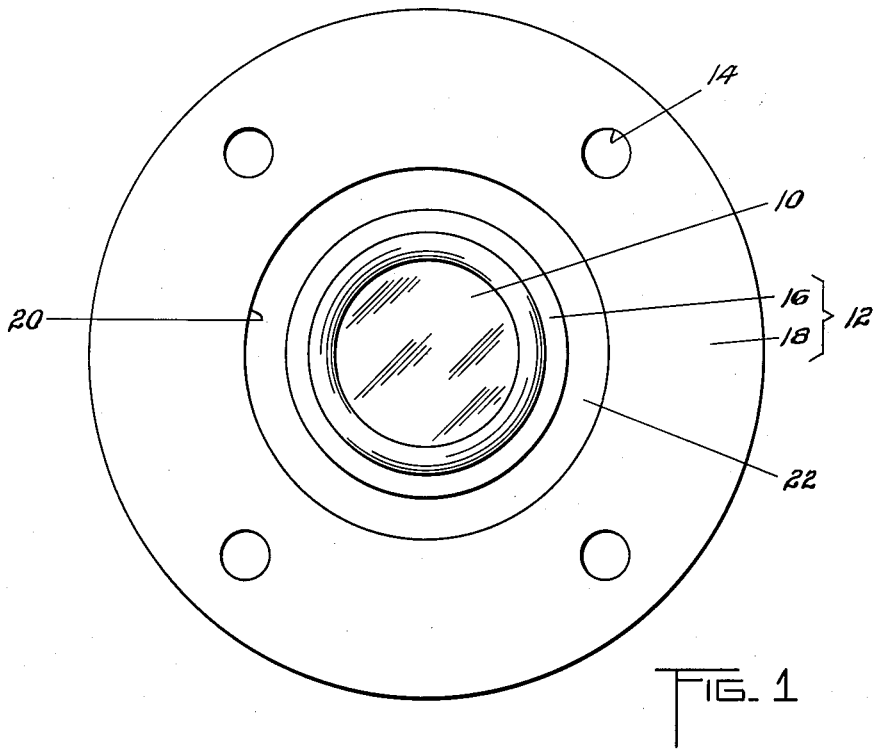
Fig. 1 is the enlarged plan view of a window of circular form.
Figure 2:
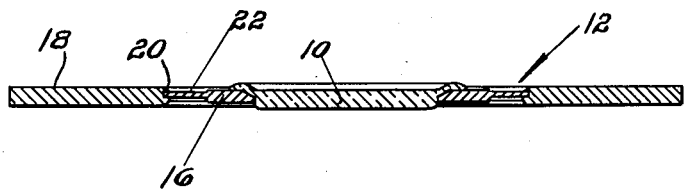
Fig. 2 is a central sectional view of the window in Fig. 1.

The invention is illustrated as applied to a flat circular window although in principle the invention applies to windows of elliptical and other forms. The window includes a central glass portion 10 fused to a metal frame 12 formed with holes 14 for bolts that are to clamp the window to a flange (not shown) in a wave-guide section. In order that glass 10 may be of acceptable high-frequency characteristics, hard glasses are commonly used; and the metal portion of the window is of an alloy chosen for thermal expansion characteristics as close as possible to that of the hard glass. The commercial alloy "Kovar" including 30% nickel, 15% cobalt, a trace of manganese, and the balance of iron, is acceptable for this purpose. However, an essentially flat window having a small glass center and a relatively massive Kovar flange is difficult to make because of the extreme stress applied by the Kovar ring to the glass center.

The flange illustrated may be made of Kovar, formed of two annuli. The cross section of the inner annulus should be limited sufficiently to yield somewhat without warping and absorb part of the stress that would otherwise be concentrated in the glass center alone. This stress as noted above arises from the slight differences in thermal characteristics between the glass and the metal alloy. In order to fuse the glass to the Kovar, the parts are raised to a temperature of the order of 1100° C., conveniently in an induction furnace.

To extend the dimensions of the window as required, an outer frame 18 is provided, preferably of the same alloy as that of frame 16 or a metal chosen for proper thermal characteristics. The two frames are united at 20 as with soft solder to form a pressure-tight joint. If soft solder is used the temperature required in making the joint is about 200° C. Hard solder can also be used requiring almost 800° C., but its use requires more careful attention to uniform heating to avoid warping and partly for this reason a hydrogen furnace is recommended. In any event the temperature required for the uniting operation is much lower than that required to fuse the glass center in place. Consequently any differences in thermal expansion during the soldering operation would establish stresses considerably lower than are involved in the case of a glass center that is fused to a large one-piece alloy frame where the relatively massive metal frame confines the strain almost entirely to the glass center. The same metal in both frames also assures like expansion and contraction of both due to temperature changes in use, thereby avoiding undesirable stresses in the soldered joint.

For further reducing the possibility of transmission of cooling stresses from outer frame 18 to the glass center 10, a zone 22 of reduced thickness is incorporated. Preferably this zone is at the outer edge of inner frame or ring 16, although it could be formed at the inner edge of frame or ring 18. As shown, the soldered joint is at a maximum distance from the glass center, an advantage in the case of soft-soldering with local application of heat. Even in the case of hard-soldering, or of soft-soldering where the assembly to be soldered is uniformly heated in a furnace, the zone of reduced thickness 22 should preferably be provided at the outer edge of ring 16 to minimize any possible tendency to warping. The zone of reduced thickness is also a great advantage in pressurizing a section of waveguide on one side of the window. The glass might otherwise crack. The thinned zone tends, too, to take up slight mechanical deformation in outer frame 18 as it is clamped to the wave-guide flanges. This form of resilient construction about the glass achieves these mechanical advantages without introducing reflections or otherwise adversely affecting the electrical performance of the window.

As an indication of proportions, the outer diameter of ring 18 in one instance is 2.5 inches, its inner diameter is 1.37 inches, and the diameter of the window aperture in ring 16 is .68 inch. Ring 18 is of .060 inch thick, and ring 16 is .050 inch reduced to .020 inch in zone 22 that occupies about half the width or radial extent of ring 16. As seen in the drawings, the entire assembly is essentially flat.

The illustrative embodiment of the invention will obviously be subject to detailed modification and varied uses. Therefore the appended claims should be given broad interpretation consistent with the spirit of the invention.

What is claimed is:

1. A high-frequency window comprising a glass center and a surrounding metal frame to which the glass is fused, said metal frame being of a composition having approximately the same thermal coefficient of expansion as that of the glass, and being composed of an outer frame portion, and an inner frame portion, said portions being connected by a substantially flat zone of reduced thickness, the entire assembly being essentially flat.

2. A window comprising a round glass center, a metal annulus sealed to said glass center, said annulus having a zone of reduced thickness at its outer periphery, and a relatively massive annulus encircling the first-mentioned annulus and hermetically sealed thereto, said metal annuli being both of the same composition and said metal annuli having approximately the same thermal coefficient of expansion as that of the glass, the entire assembly constituting a substantially flat unit.

3. An essentially flat window comprising a substantially flat glass disc, a ring encircling and fused to said glass disc, said ring being of limited cross-sectional area, a second ring of larger cross-sectional area encircling and joined to said first-mentioned ring, the assembly of said rings incorporating a substantially flat intermediate circular zone of reduced thickness, the metal from which both said rings are formed being of a composition having approximately the same thermal coefficient of expansion as that of the glass disc, the entire assembly being essentially flat.

References Cited in the file of this patent

UNITED STATES PATENTS

| | | |
|---|---|---|
| 2,075,477 | Smith | Mar. 30, 1937 |
| 2,089,541 | Dallenbach | Aug. 10, 1937 |
| 2,178,826 | Bowie | Nov. 7, 1939 |
| 2,219,573 | Fraenckel | Oct. 29, 1940 |
| 2,231,459 | Anderson | Feb. 11, 1941 |
| 2,298,874 | Dennison et al. | Oct. 13, 1942 |
| 2,419,049 | Alpert | Apr. 15, 1947 |
| 2,584,653 | Alpert | Feb. 5, 1952 |

FOREIGN PATENTS

| | | |
|---|---|---|
| 583,242 | Great Britain | Dec. 12, 1946 |